United States Patent
Han et al.

(10) Patent No.: US 10,951,923 B2
(45) Date of Patent: Mar. 16, 2021

(54) METHOD AND APPARATUS FOR PROVISIONING SECONDARY CONTENT BASED ON PRIMARY CONTENT

(71) Applicant: AT&T Intellectual Property I, L.P., Atlanta, GA (US)

(72) Inventors: Bo Han, Bridgewater, NJ (US); Sassan Pejhan, Princeton, NJ (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/106,448

(22) Filed: Aug. 21, 2018

(65) Prior Publication Data
US 2020/0068227 A1 Feb. 27, 2020

(51) Int. Cl.
| | |
|---|---|
| *H04N 21/218* | (2011.01) |
| *H04N 21/234* | (2011.01) |
| *H04N 21/2343* | (2011.01) |
| *H04N 21/236* | (2011.01) |
| *H04N 21/262* | (2011.01) |

(Continued)

(52) U.S. Cl.
CPC ... *H04N 21/21805* (2013.01); *H04N 5/23238* (2013.01); *H04N 21/23424* (2013.01); *H04N 21/44218* (2013.01); *H04N 21/812* (2013.01); *H04N 21/8547* (2013.01)

(58) Field of Classification Search
None
See application file for complete search history.

(56) References Cited

U.S. PATENT DOCUMENTS

| | | |
|---|---|---|
| 7,340,457 B1 | 3/2008 | Killian et al. |
| 8,146,129 B2 | 3/2012 | Ramsdell et al. |

(Continued)

FOREIGN PATENT DOCUMENTS

GB 2485573 A 5/2012

OTHER PUBLICATIONS

B., Freddie, "Mobile Vs Desktop Video: How Do They Compare?", https://www.linkedin.com/pulse/mobile-vs-desktop-video-how-do-compare-freddie-benjamin, Aug. 20, 2015, 4 pages.

(Continued)

*Primary Examiner* — Brian T Pendleton
*Assistant Examiner* — Jean D Saint Cyr
(74) *Attorney, Agent, or Firm* — Guntin & Gust, PLC; Mark Wilinski

(57) ABSTRACT

Aspects of the subject disclosure may include, for example, identifying a region of interest included in a plurality of candidate regions of interest associated with a presentation of a first content item on a user equipment, wherein the first content item includes a panoramic video, comparing first metadata associated with the region of interest to a plurality of metadata associated with a plurality of secondary content items, responsive to the comparing, identifying a second content item included in the plurality of secondary content items, wherein the identifying of the second content item is based on a distance between the first metadata and second metadata associated with the second content item being less than a threshold, and transmitting the second content item to the user equipment responsive to the identifying of the second content item. Other embodiments are disclosed.

20 Claims, 13 Drawing Sheets

(51) Int. Cl.
*H04N 21/431* (2011.01)
*H04N 5/232* (2006.01)
*H04N 21/8547* (2011.01)
*H04N 21/81* (2011.01)
*H04N 21/442* (2011.01)

(56) References Cited

U.S. PATENT DOCUMENTS

| | | | |
|---|---|---|---|
| 8,781,262 B2 | 7/2014 | Rosenblatt | |
| 2004/0264485 A1* | 12/2004 | Okamura | H04L 12/403 370/412 |
| 2008/0114633 A1 | 5/2008 | Wolf et al. | |
| 2008/0120176 A1* | 5/2008 | Batni | G06Q 30/0211 705/14.13 |
| 2008/0304571 A1* | 12/2008 | Tsukagoshi | H04N 21/4307 375/240.25 |
| 2010/0183000 A1* | 7/2010 | Nakayama | H04N 21/242 370/352 |
| 2011/0145370 A1 | 6/2011 | Nieuwenhuys | |
| 2011/0313856 A1 | 12/2011 | Cohen et al. | |
| 2013/0091246 A1 | 4/2013 | Urbanski et al. | |
| 2013/0219444 A1* | 8/2013 | Kitazato | H04N 21/4307 725/110 |
| 2013/0263182 A1 | 10/2013 | Ivy et al. | |
| 2014/0136596 A1 | 5/2014 | Watfa et al. | |
| 2014/0245335 A1 | 8/2014 | Holden et al. | |
| 2014/0258850 A1* | 9/2014 | Carey | G06F 16/5838 715/243 |
| 2014/0278845 A1 | 9/2014 | Teiser et al. | |
| 2018/0160160 A1* | 6/2018 | Swaminathan | H04N 21/8456 |
| 2019/0044988 A1* | 2/2019 | Oesterreicher | H04L 65/602 |

OTHER PUBLICATIONS

Kuzyakov, Evgeny et al., "Under the hood: Building 360 video", https://code.facebook.com/posts/1638767863078802/under-the-hood-building-360-video/, Oct. 15, 2015, 7 pages.

Morrison, Kimberlee, "Internet Users Want a More Personalized Ad Experience (Report)", https://www.adweek.com/contributor/Kimberlee-Morrison/, May 18, 2016, 11 pages.

Nickull, Duane et al., "Web 2.0 Architectures—What Entrepreneurs and Information Architects Need to Know", Adobe Developer Library, May 2009, 3 pages.

Pandolph, Stephanie, "Personalized Video Ads Are Engaging Consumers", https://www.businessinsider.com/personalized-video-ads-are-engaging-consumers-2017-11, Nov. 24, 2017, 1 page.

* cited by examiner

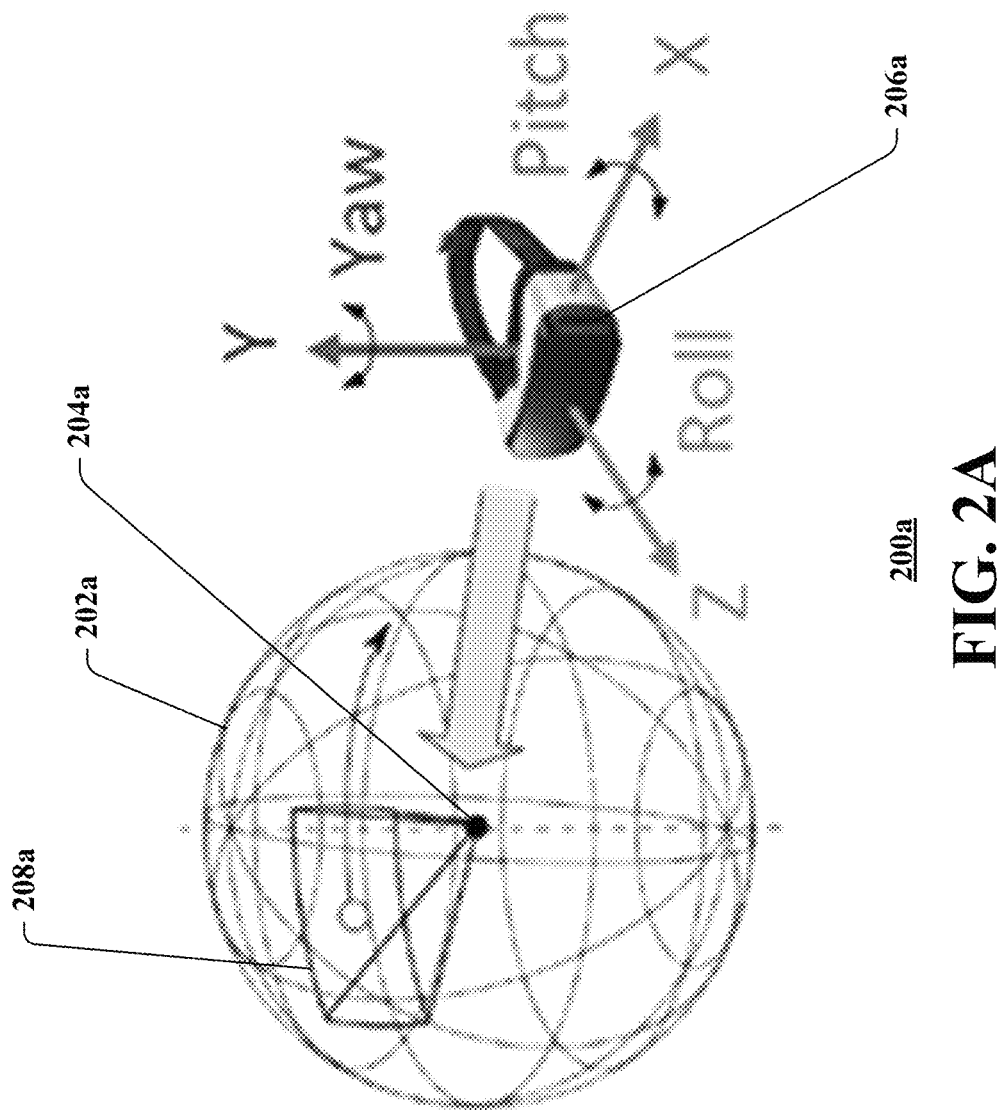

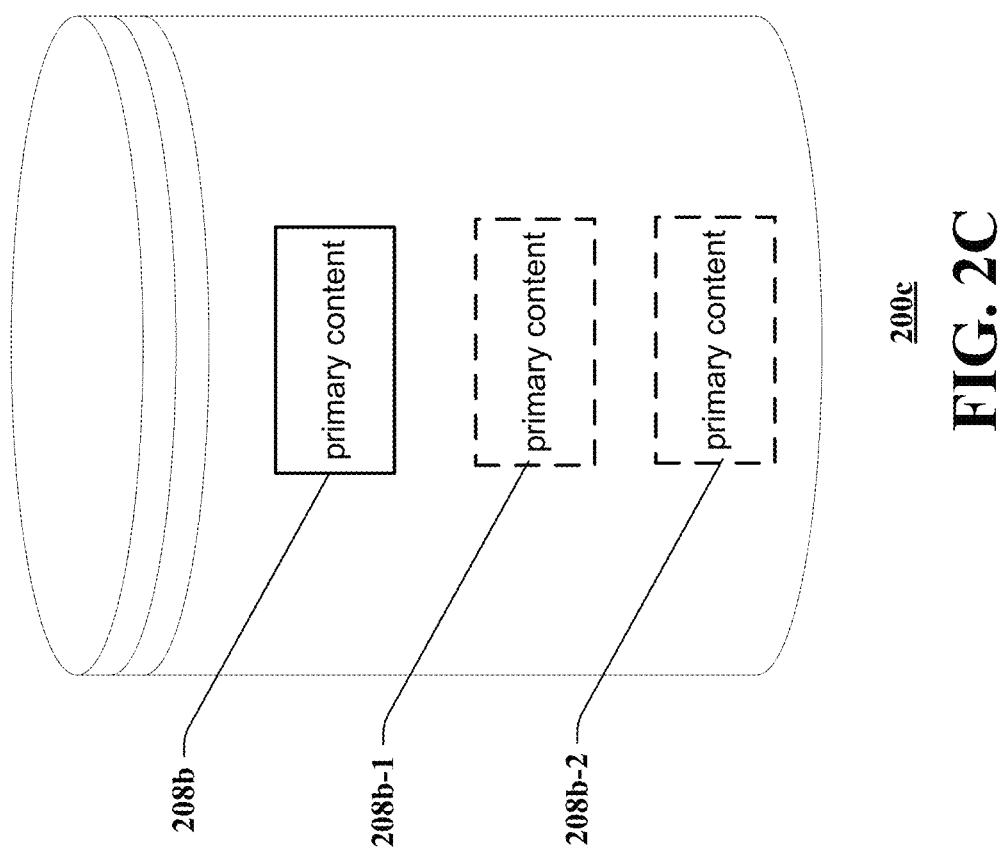

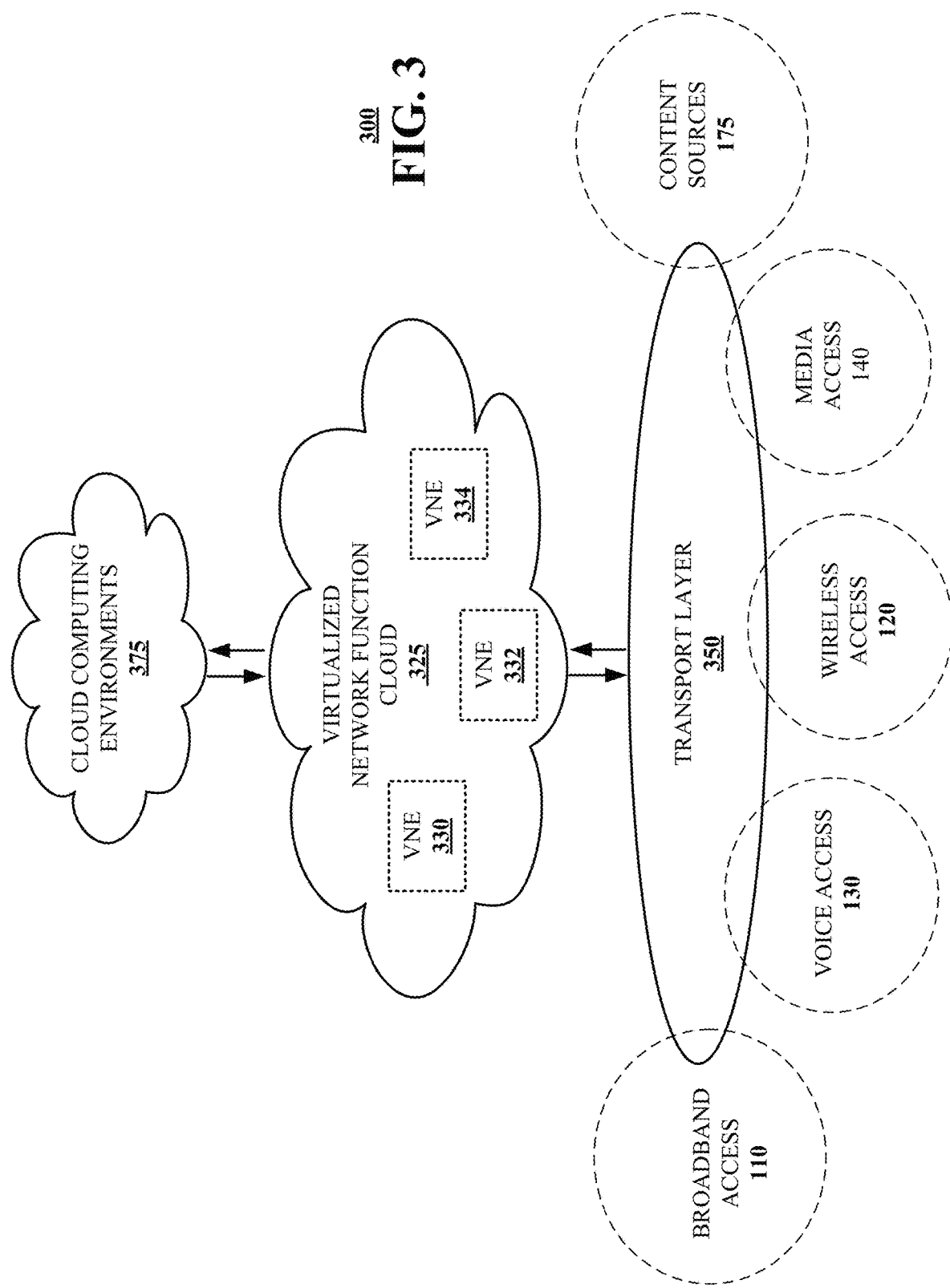

METHOD AND APPARATUS FOR PROVISIONING SECONDARY CONTENT BASED ON PRIMARY CONTENT

FIELD OF THE DISCLOSURE

The subject disclosure relates to a method and apparatus for provisioning panoramic content.

BACKGROUND

Panoramic content can provide users with a unique, immersive experience that is otherwise unavailable with more conventional/traditional content. A user can control the content she consumes/observes by changing her viewing direction, for example. As a result, even for the same panoramic content, two different users may observe different portions of the same item of content, creating a unique immersive experience for each of the users.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 2C depicts a database that stores various items of primary content in accordance with aspects of this disclosure.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying/selecting secondary content that is related to primary content received and/or presented by a user equipment. Other embodiments are described in the subject disclosure.

One or more aspects of the subject disclosure include a selection and a delivery of primary content for presentation by the user equipment.

One or more aspects of the subject disclosure include an identification of a region of interest (ROI) included in the primary content.

One or more aspects of the subject disclosure include an identification/selection of secondary content related to the ROI. The identification of the secondary content may be based on additional considerations.

One or more aspects of the subject disclosure include a transmission of the secondary content to the user equipment for receipt and presentation by the user equipment.

Figure 1:
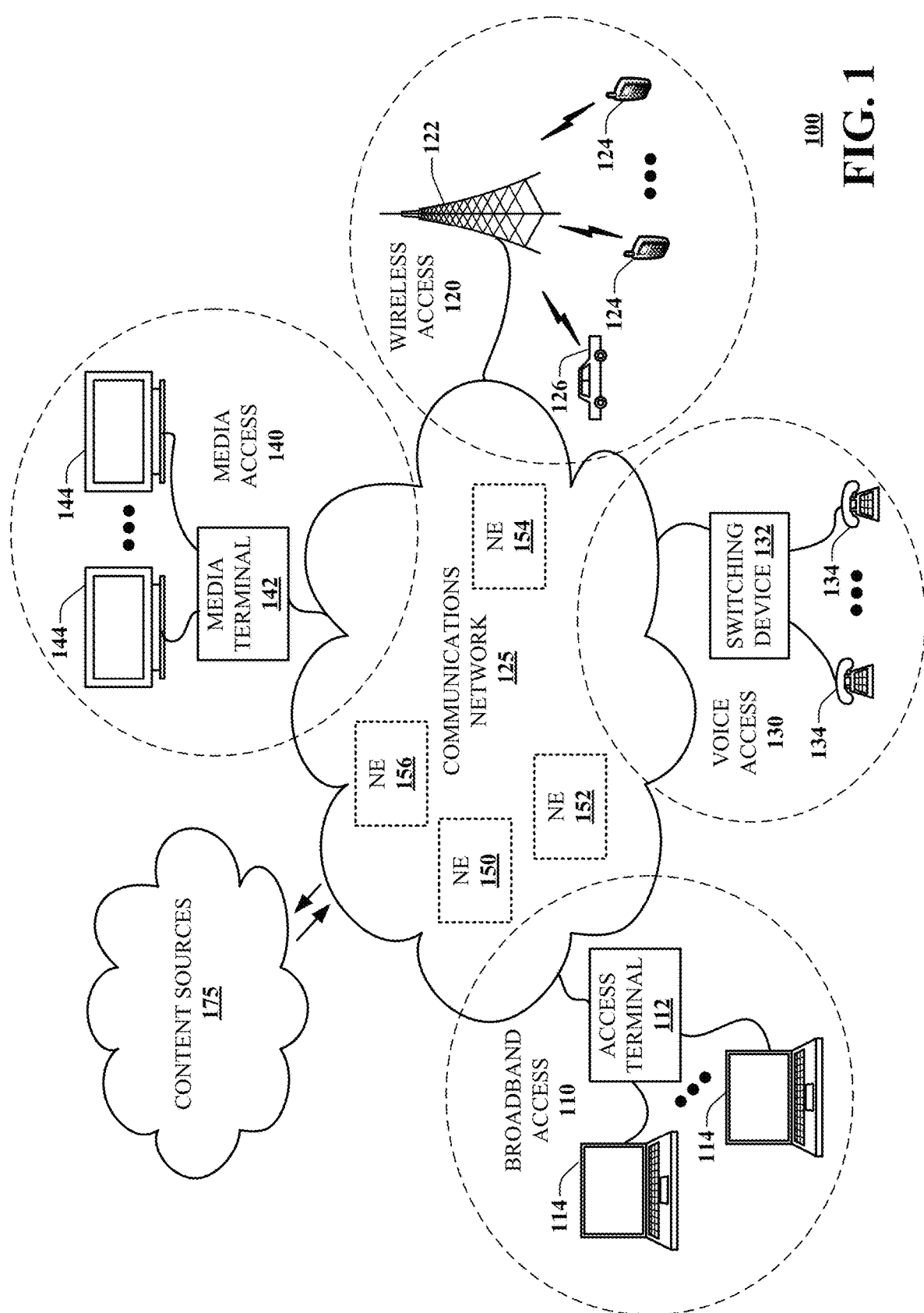
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate, in whole or in part, a provisioning of supplemental content associated with a first content item (e.g., a panoramic video). In some embodiments, a selected/identified region of interest (ROI) included in a plurality of candidate ROIs associated with a presentation of the first content item may be identified. First tags/metadata associated with the identified ROI may be compared to a plurality of metadata associated with a plurality of secondary content items. Based on, or responsive to, the comparison, a second content item included in the plurality of secondary content items may be identified. The second content item may be identified based on a difference/distance between the first metadata and second metadata associated with the second content item being less than a threshold. In some embodiments, the second content item may be provided/transmitted to, e.g., a user equipment for presentation at the user equipment.

Referring back to FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within the communication network of FIG. 1 in accordance with various aspects described herein. In particular, and as described above, aspects of the disclosure may be applied in conjunction with a first content item, such as for example a panoramic video. Still further, a panoramic video may include a 360-degree video.

Panoramic videos may be recorded by omnidirectional cameras or camera array systems, and then "wrapped" onto at least a portion of a three-dimensional (3D) sphere (e.g., 3D sphere 202a), with the cameras at or proximate a center 204a of the sphere. When watching a panoramic video, a user/viewer at the spherical center 204a can freely control her viewing direction, so each playback may create a unique viewing experience. The control of viewing directions may be achieved through, e.g., head movement when using a head-mounted device, hand/finger movement when using a mobile/portable communication device (e.g., a phone or a tablet), a mouse click when using a laptop or desktop computer, or use of a remote control or trackball when using a display device such as a television. Other techniques, such as for example gesture recognition, may be used. One or more combinations of the controls described above may be used.

As shown in FIG. 2A, a virtual reality (VR) headset 206a can be used to adjust a viewing orientation by changing the pitch, yaw, and/or roll, which correspond to movement (e.g., rotation) along the super-imposed X, Y, and Z axes, respectively. The headset 206a may support operations in accordance with six degrees/dimensions of freedom. For example, the X, Y, and Z axes collectively represent three dimensions of freedom, and movement along any one of the axes (e.g., in a plus or minus direction) represents another degree/dimension of freedom.

Panoramic video players may compute and display the viewing area based on the viewing orientation and the field of view (FoV). The FoV defines the extent of an observable area 208a, which may be a fixed or dynamic parameter of the VR headset 206a. In an illustrative embodiment, the observable area 208a may be 110° horizontally (+/−10%) and 90° vertically (+/−10%). Other values of the observable area 208a may be used in some embodiments.

A number of projection schemes may be used for creating/generating panoramic videos. As used herein, a projection is a transformation of the locations from the surface of a sphere (e.g., sphere 202a) into locations on a plane (where the plane may substantially correspond to the observable area 208a). As one skilled in the art would appreciate, two popular/common projection techniques are equirectangular and cube map.

In terms of panoramic video streaming, a simple technique that may be used is to deliver all panoramic views to a user equipment/client device, even if the user equipment is not oriented to consume/present a particular view. Such a technique simplifies the determinations that need to be made by, e.g., a content delivery server. However, this technique of delivering all the video content/panoramic views is not especially network friendly (e.g., may lead to unnecessary network congestion or bandwidth utilization), as a user likely will watch only a fraction of the transmitted video. For more advanced schemes/techniques that perform viewport adaptation, the schemes can generally be divided into two categories: (1) a tile based scheme, and (2) a version based scheme.

In a tile based scheme, a panoramic video may be spatially segmented into tiles. Tiles that are within the FoV may be transmitted (at a relative high degree of quality), whereas tiles that are outside of the FoV are either not transmitted or are transmitted at a lower degree of quality.

In a version based scheme, a panoramic video may be encoded into multiple versions, with each version including a different high-quality region. A user equipment may select an appropriate version for receipt (e.g., download, streaming, etc.) based on a user's viewing direction/FoV. One practical drawback of the version based scheme is that it may incur significant overhead at, e.g., a server or database due to the maintenance (e.g., storage) of the different versions of the video.

As described above, while panoramic videos offer users a unique and immersive viewing experience, a user frequently desires more information or (secondary) content in relation to (first) content (e.g., objects, scenes, regions, etc.) that the user is observing. For example, the information or secondary content may include an advertisement that corresponds to an object in a panoramic video that is being viewed by a user. For traditional advertising which uses coarse-granularity content analysis, two different users viewing the same set of videos will receive the same targeted advertisements, as the analysis is merely based on the genre of the videos or retrieved textual information (e.g., captions).

In contrast, aspects of this disclosure facilitate and provide for a provisioning of secondary content (e.g., advertisements) that coincide with/correspond to one or more portions of a first/primary content item that are observed by a user. In this respect, a finer granularity may be obtained in terms of an identification of a portion of primary content that a particular user actually observed, such that the secondary content that may be provided (e.g., transmitted) to the user (or associated user equipment) can be customized/tailored to that user. For example, once the portion of the primary content that is observed by a user is identified, it may be possible to determine (e.g., infer) the user's probable interests. Such probable interests may be identified/based at least in part on a collaborative filtering technique.

Aspects of the disclosure may be used to provide personalized secondary content (e.g., advertisements) while assisting content creators/generators in reaching users that are most likely to be interested in the secondary content. Aspects of the disclosure may assist resource (e.g., network) operators increase (e.g., maximize) efficiency in terms of a ratio of realized user interest per unit of resource used/consumed; in an online advertising context, this ratio is frequently referred to as a click through rate (CTR) and is representative of the rate at which users select advertisements that are presented.

While some of the examples described herein relate to panoramic content, aspects of the disclosure may be applied in connection with non-panoramic content. For example, for a non-panoramic video, a gaze tracking technique may be applied/used to identify secondary content that is likely to be of interest to a user. Based on an analysis of a portion of the non-panoramic video that is actually observed by the user (where the portion is identified based on the gaze tracking technique, or any other technique), the secondary content may be identified/determined.

Aspects of the disclosure provide for a passive determination/identification of portions of content that are actually observed by a user. Aspects of the disclosure may include an affirmative/active determination/identification of such portions. For example, a user may provide an indication of a portion of content that is being consumed by speaking into a microphone of a user equipment. The user may utter an expression, such as for example a statement that "the flower shown in this video is beautiful". On the basis of such a statement, a determination may be made that the user is viewing a flower depicted in a video presented on a user equipment. Secondary content associated with the flower may be identified on the basis of the statement.

Aspects of the disclosure may be applied in conjunction with text, images, or videos that may be presented on a website. For example, keywords associated with the website may be identified and secondary content (e.g., advertisements) that are based on the keywords may be identified/selected. For example, if a user is visiting a website that is associated with a sporting event (e.g., a basketball game), the user may be presented with advertisements associated with sporting goods stores or ticket brokers. In some embodiments, secondary content (e.g., advertisements) may be embedded in primary content (e.g., search results) that are returned by a search engine. The primary content (e.g., search results) may be based on keywords provided by a user/user equipment.

Aspects of the disclosure may be applied in conjunction with contextual advertising. In connection with contextual advertising, an advertiser may apply one or more techniques to target users with a specified set of traits. For example, an advertiser associated with a sporting goods store may identify a pool/collection of users with traits (e.g., are members of a gym or team, have watched or attended a number of sports games/events above a threshold amount, etc.) that are likely indicative of an interest in merchandise sold/distributed by the sporting goods store. Similarly, in relation to personalized advertising (which is also known as interest-based advertising), an advertiser may provide advertisements to users based on their interests (which may be specified in, e.g., a social media profile, a web blog or chat board, etc.) or demographics (e.g., a user is above or below a given age, has an income above or below a threshold amount, has achieved a particular education level/status, occupation, etc.).

Figure 2B:
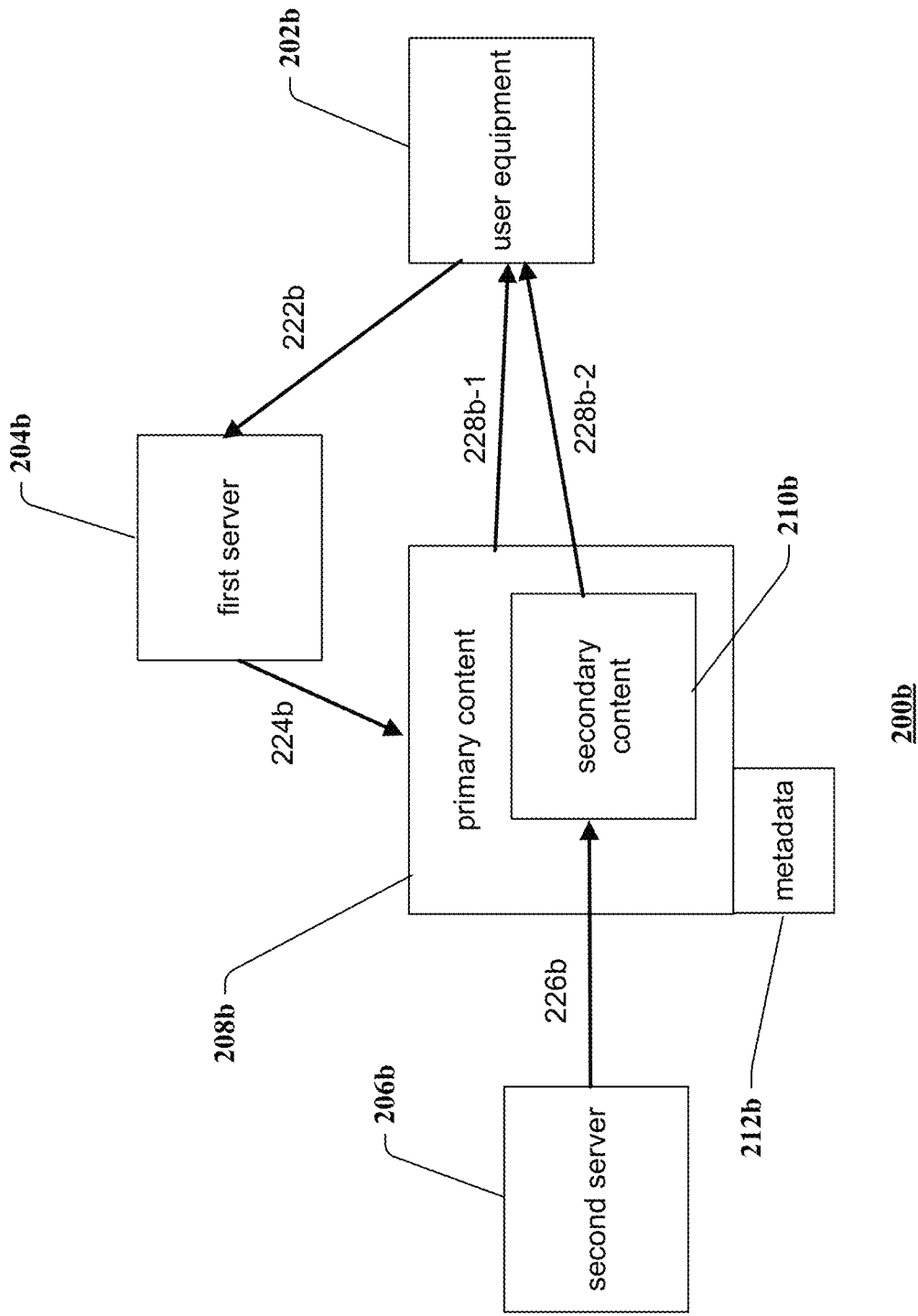
FIG. 2B depicts an illustrative embodiment of a system for transmitting and receiving primary and secondary content in accordance with various aspects described herein.

Referring to FIG. 2B, a system 200b for identifying secondary content (e.g., advertisements) in accordance with one or more embodiments of this disclosure is shown. The system 200b may include a user/user equipment 202b, a first server 204b, and a second server 206b. While the first server 204b and the second server 206b are shown separately in FIG. 2B, in some embodiments the first server 204b and the second server 206b may correspond to a same/common server.

The system 200b may be used to provide content/content items to the user equipment 202b. For example, such content may include primary content 208b and secondary content 210b. In some embodiments, the primary content 208b may include one or more of a panoramic video, web content, audio (e.g., music), etc. In some embodiments, the secondary content 210b may include an advertisement/coupon that may be presented in one or more forms (e.g., an email, a text message, an auditory message, an image, a video, etc.).

In some embodiments, the secondary content 210b may be at least partially embedded in the primary content 208b. For example, the secondary content 210b may be received by the user equipment 202b substantially simultaneously with the receipt of (at least a portion of) the primary content 208b by the user equipment 202b. In some embodiments, the secondary content 210b may be at least partially separated/segregated from the primary content 208b. For example, the secondary content 210b may be received by the user equipment 202b subsequent to the receipt of the primary content 208b by the user equipment 202b.

In operation, the user equipment 202b may generate and transmit a request for content as represented by the arrow 222b. Providing content based on a request (e.g., the request 222b) for the same may be referred to herein as (an application of) a "pull" model/technique. In some embodiments, content may be provided to the user equipment 202b without an affirmative request (e.g., request 222b) being generated for such content in the first instance. Providing content without a request (e.g., request 222b) being present may be referred to herein as (an application of) a "push" model/technique.

The request 222b may pertain to the primary content 208b and/or the secondary content 210b. For example, in the context of a panoramic video associated with a botanical garden, the user equipment 202b may transmit a search term/phrase such as "botanical garden videos" on the user equipment 202b. The request 222b may include additional information, such as for example an identification of (a capability of) the user equipment 202 (e.g., a make, model, and/or serial number of the user equipment), an identification of a user (e.g., a username), a credential (e.g., a biometric credential such as a fingerprint or retinal scan of a user of the user equipment 202b, a password or personal identification number of the user, currency/payment, etc.), a profile (e.g., a social media profile of the user or the user's contacts/friends, a history/log of activities undertaken by the user or content/media consumed by the user equipment 202b or the user, etc.), a location of the user equipment 202b (which may be based on a triangulation technique, GPS coordinates, an IP address associated with the user equipment 202b or another device associated with, or in communication with, the user equipment 202b, etc.), etc. To the extent that (at least a portion of) the primary content 208b is being presented at the user equipment 202b, the request 222b may include an identification of a region of interest (ROI) in the primary content 208b as described further below.

The first server 204b may receive the request 222b and process the request to identify (one or more portions of) the primary content 208b as represented by the arrow 224b. For example, the first server 204b may select (the one or more portions of) the primary content 208b based on an analysis of one or more of the factors/parameters/conditions described above in connection with the request 222b.

The primary content 208b may include, or have associated therewith, one or more tags or metadata, such as for example tags/metadata 212b. The tags/metadata 212b may be used for purposes of comparison as described further below. The tags/metadata 212b may include keywords associated with a ROI as described further below.

The first server 204b may obtain the (one or more portions of the) primary content 208b from a library/database that is accessible by the first server 204b. For example, and referring to FIG. 2B and FIG. 2C, the first server 204b may obtain the (one or more portions of the) primary content 208b from a database 200c. The database 200c may store other content items, such as for example content items 208b-1 and 208b-2. The content items 208b-1 and 208b-2 may correspond to portions of the primary content 208b that are not being observed by a user (e.g., are located outside of a FoV of the user) or may correspond to different content items.

Referring back to FIG. 2B, the second server 206b may identify/select the secondary content 210b as represented by the arrow 226b. The second server 206b may select the secondary content 210b based at least in part on an analysis of one or more of the factors/parameters/conditions described above in connection with the request 222b and as described further below.

Figure 2D:
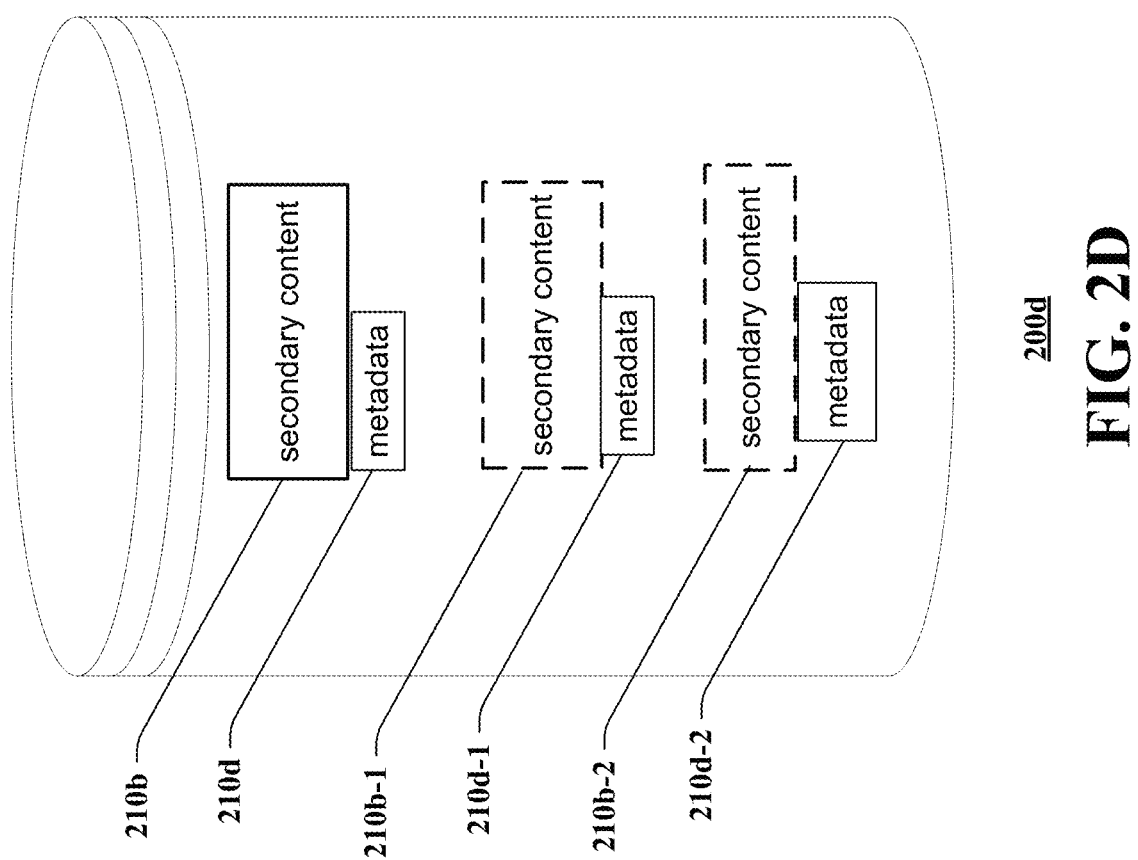
FIG. 2D depicts a database that stores various items of secondary content in accordance with aspects of this disclosure.

The second server 206b may select the secondary content 210b based at least in part on an identification of (the one or more portions of) the primary content 208b identified/selected in conjunction with the arrow 224b. For example, and referring to FIG. 2B and FIG. 2D, in some embodiments the metadata 212b associated with (an identified/selected ROI in) the primary content 208b may be compared to a plurality of tags/metadata (e.g., metadata 210d, 210d-1, 210d-2, etc.) respectively associated with a plurality of secondary content items (e.g., content items 210b, 210b-1, 210b-2, etc.). The secondary content items 210b, 210b-1, 210b-2, etc., may be stored in a library/database 200d that may be accessible to the second server 206b.

In some embodiments, the database 200d may correspond to the database 200c of FIG. 2C, which is to say that the databases 200c and 200d may be a same/common database.

The secondary content item 210b (potentially as opposed to the secondary content items 210b-1 and 210b-2) may be selected by the second server 206b based on the metadata 212b more closely matching the metadata 210d than the metadata 210d-1 or the metadata 210d-2. More generally, one or more secondary content items that may be selected by the second server 206b for distribution/transmission to the user equipment 202b may be based on a distance/difference between the metadata 212b and the respective metadata associated with a given secondary content item being less than a threshold. In the embodiments reflected by FIG. 2B and FIG. 2D, the distance/difference associated with the metadata 210d may be less than the threshold, whereas the respective distances/differences associated with the metadata 210d-1 and the metadata 210d-2 may be greater than the threshold.

Referring to FIG. 2B, the selected primary content 208b may be provided/transmitted to the user equipment 202b as represented by the arrow 228b-1. The selected secondary content 210b may be provided/transmitted to the user equipment 202b as represented by the arrow 228b-2.

While shown separately, the arrows 228b-1 and 228b-2 may be the same arrow, which is to say that the primary content 208b and the secondary content 210b may be provided to the user equipment 202b as part of a common transmission. In some embodiments, separate transmissions may be used to provide one or more portions of the primary content 208b and one or more portions of the secondary content 210b.

The arrows shown in FIG. 2B may establish a feedback loop between the user equipment 202b and the servers 204b and 206b. For example, as user or user equipment inputs are generated, those inputs may be transmitted to, e.g., the first server 204b as part of the request 222b. The inputs may be analyzed by the first server 204b and/or the second server 206b to select content (e.g., secondary content 210b) that most closely aligns with perceived/inferred interests of the user. In this respect, a customized/tailored user experience may be obtained in terms of a provisioning of content for user consumption/observation.

Aspects of the disclosure may provide for embedded secondary content in connection with primary content. In some embodiments, the secondary content may include an advertisement, such as for example a personalized video advertisement. The primary content may include a video, such as for example an online streaming video.

There may be multiple parties/entities that may leverage the technology of this disclosure. For example, in an advertising context there may be: (1) advertisers that want to promote a product or service via an advertisement, (2) users that consume/observe (e.g., view or listen to) the advertisement, and/or (3) service providers/network operators that select the advertisement to provide to a given user or collection of users based on, e.g., preferences or interests. The advertisers may compensate the service providers/network operators. In some embodiments, the compensation may be based on a number of selections of the advertisement by users. In an online setting, the user selections of the advertisement may be based on "clicks" of the advertisement on a website.

A goal of an advertiser may include having an advertisement reach users that have interests/preferences that are aligned with the substance of the advertisement. For example, a user interested in sports may be particularly suited to receive an advertisement related to a sporting goods store relative to, e.g., an advertisement related to ecological studies. Conversely, a professor at a university may be better suited/positioned to receive an advertisement related to ecological studies relative to a sports goods store.

Users may want to receive advertisements that align with their interests or preferences. For example, such advertisements may appeal to the users and encourage the users to obtain (e.g., purchase) products or services associated with the advertisements. Conversely, if a first set of advertisements are not aligned with the interests/preferences of the users, the users may tend to ignore a future second set of advertisements (even if the second set of advertisements is aligned with user interests/preferences).

Service providers/network operators may want to improve the efficiency, scalability, and robustness of their resources (e.g., systems, devices, and/or components) and maximize their revenue or profits. The effectiveness of an advertising system can be measured by the click through rate (CTR) for web-based systems and brand perception for video-based systems.

Figure 2E:
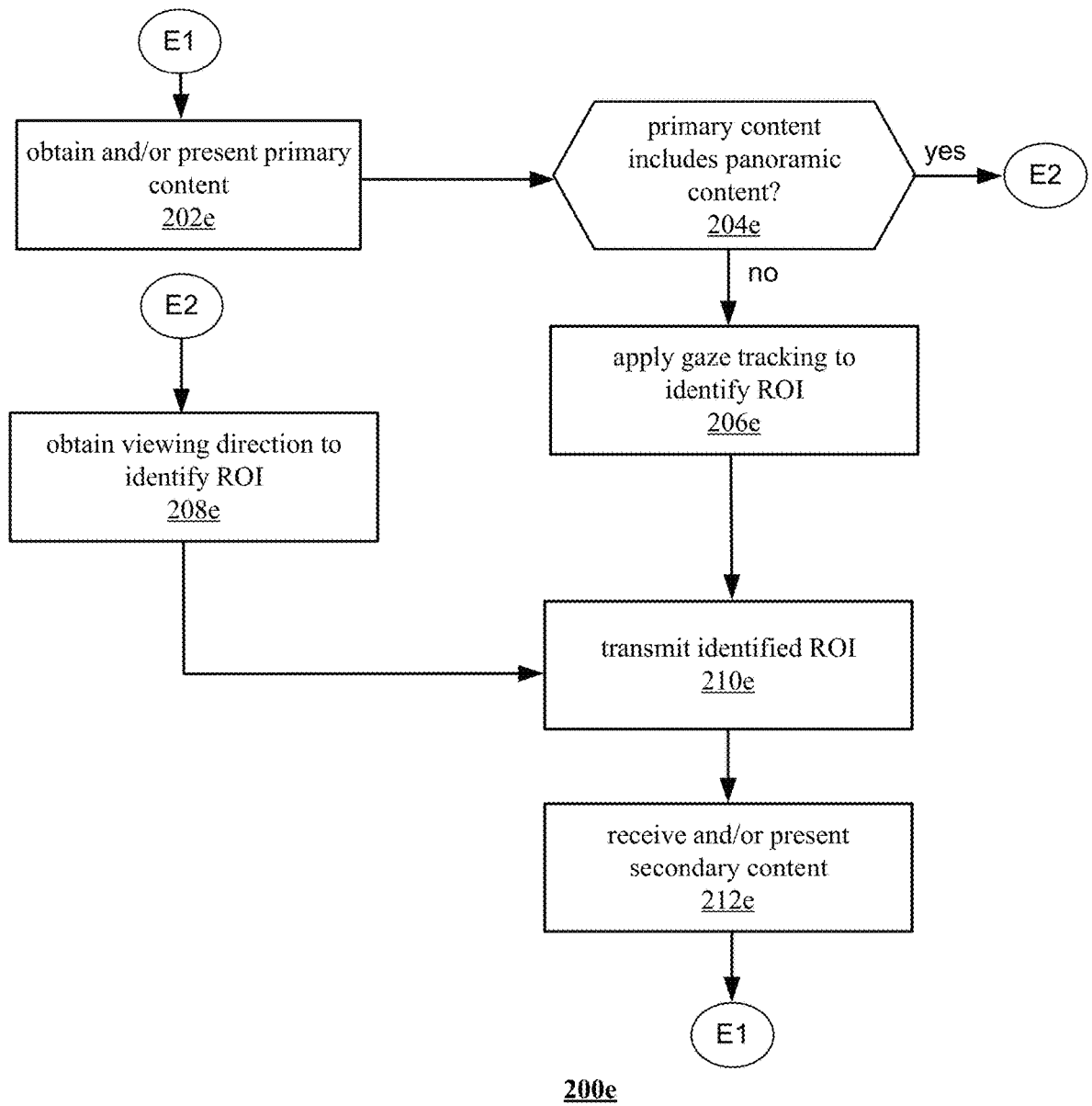
FIG. 2E depicts an illustrative embodiment of a method in accordance with various aspects described herein.

Aspects of the disclosure are tailored to satisfy the needs/desires/objectives of advertisers, users, and service providers/network operators alike. For example, FIG. 2E depicts an illustrative embodiment of a method 200e in accordance with various aspects described herein. The description provided below is based on the method 200e being executed in conjunction with the system 200b of FIG. 2B. For example, the method 200e may be at least partially executed by the user equipment 202b of FIG. 2B. The method 200e may be adapted so as to be executed by other types of systems or devices.

In block 202e, a user equipment may obtain and/or present primary content (e.g., primary content 208b of FIG. 2B). In some embodiments, the primary content may be obtained based on a push model, wherein the user equipment obtains the primary content without specifically/affirmatively requesting the primary content. For example, the primary content may be selected based on a profile of a user associated with the user equipment, a date, a time, a user equipment capability, etc.

In some embodiments, the primary content may be selected based on information contained in a user's calendar/schedule. For example, if the user's calendar indicates that the user is planning to take a trip to the greater Washington, D.C. metro area, the primary content that is obtained as part of block 202e may be related to potential points of interest in the area, such as for example museums, restaurants, sports events, concerts, tours of monuments, etc.

In block 202e, the primary content may be obtained based on a pull model, wherein the user equipment requests (e.g., request 222b of FIG. 2B) the primary content from a server (e.g., first server 204b of FIG. 2B). The request for the primary content may take one or more forms. For example, the primary content may be requested by a user entering a search term/phrase in an interface presented by the user equipment. In some embodiments, the primary content may be selected from a menu of available primary content items. The menu of available primary content items may be based on a subscription/service level in some embodiments, may be based on recommendations in accordance with a user profile, etc.

In block 202e, the primary content may be presented on one or more output devices. For example, the primary content may be presented on a display device, on headphones, on speakers, etc.

In block 204e, a determination may be made whether the primary content of block 202e includes panoramic content. If it does (e.g., the "yes" path is taken from block 204e), flow may proceed to block 208e. Otherwise (e.g., the "no" path is taken from block 204e), flow may proceed to block 206e.

In block 206e, a gaze tracking technique may be applied to identify a region of interest (ROI) in the primary content. As part of block 206e, a timestamp associated with a playback of the primary content may be obtained.

Figure 2F:
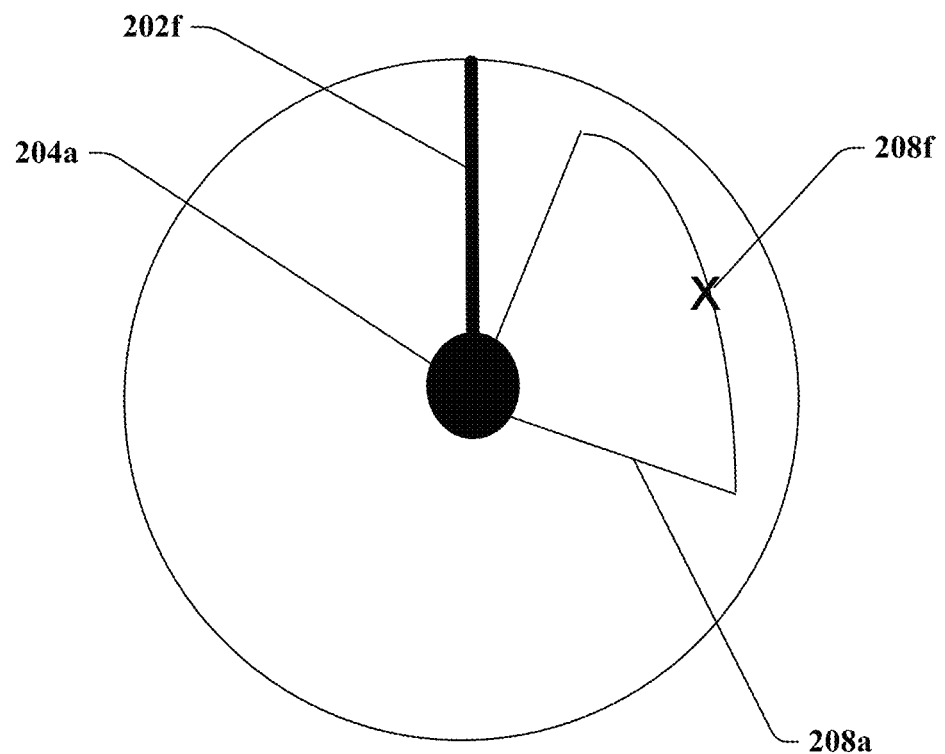
FIG. 2F depicts a position, a size, and a central point of a field of view (FoV) relative to a marker in a horizontal plane in accordance with various aspects described herein.
Figure 2G:
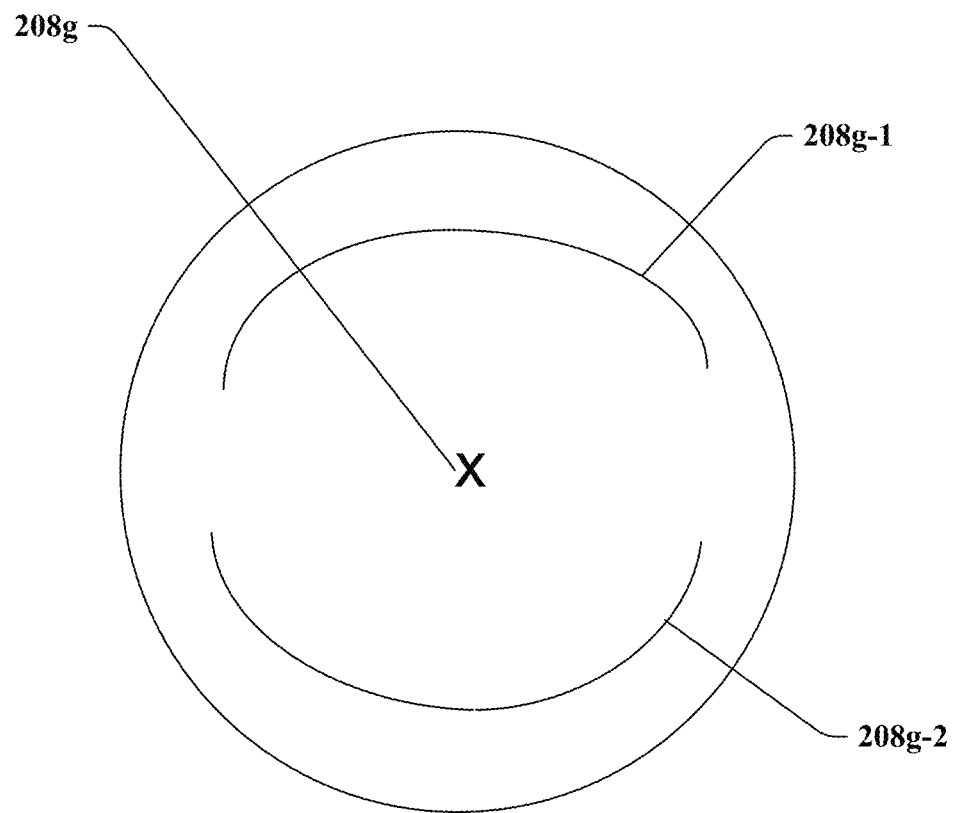
FIG. 2G depicts a (central point of a) FoV in a vertical direction in accordance with various aspects described herein.

In block 208e, a viewing direction associated with the primary content may be obtained to identify a ROI in the primary content. Referring to FIG. 2A and FIG. 2F, the viewing direction may be based on a displacement (e.g., an amount of rotation) of the FoV/observable area 208a relative to a reference marker/direction 202f in a horizontal plane (e.g., in a plane corresponding to the X-Z plane in FIG. 2A). Referring to FIG. 2A, FIG. 2F, and FIG. 2G, the viewing direction may be based on a displacement of the FoV/observerable area 208a relative to the horizontal plane in a vertical direction (e.g., along the Y-axis in FIG. 2A). As shown, the FoV/observable area 208a may be bounded in the vertical direction by an upper bound 208g-1 and a lower bound 208g-2.

Referring back to FIG. 2E, as part of block 208e, a timestamp associated with a playback of the primary content may be obtained. As part of block 208e, a size of the FoV/observable area 208a (see FIG. 2A) may be obtained. As part of block 208e, a central point of the FoV/observable area 208a may be obtained; for example, and referring to FIG. 2F and FIG. 2G, the central point of the FoV/observable area 208a may be located at a point coinciding with the X's shown at locations 208f and 208g.

An identification of the central point of the FoV/observable area 208a may be used to determine whether a user is focused on a particular object that is present in the FoV. For example, if an object is located at or proximate the central point that may serve as a better indication that the user is interested in the object than if the object is located at a greater distance from the central point. In this respect, a distance from the central point to the object may be determined in some embodiments.

Blocks 206e and 208e described above are illustrative examples of techniques that may be used to obtain information to identify one or more ROIs in the primary content. For example, the techniques described above in connection with blocks 206e and 208e are passive in nature, in the sense that the ROI is identified without intruding on/interrupting the user's consumption/observation of the primary content.

In some embodiments, active/affirmative techniques may be applied to determine/identify a ROI. For example, a user may be presented a poll, a survey, a questionnaire, or the like that requests the user to affirmatively identify a ROI in the primary content. In some embodiments, the user may speak into a microphone of the user equipment, where the user's speech may be interpreted by the user equipment using one or more speech interpretation algorithms as identifying a ROI.

In block 210e the identified/selected ROI may be transmitted by the user equipment to a server (e.g., server 204b of FIG. 2B) or another device for analysis. Such an analysis is described below in connection with FIG. 2H.

The reporting/transmission of the ROI in block 210e may occur for every frame/segment of the primary content, or at some other specified frequency or point in time (which may be based on one or more events). In some embodiments, the transmission of the ROI in block 210e may be based on network congestion. For example, during periods of elevated network congestion (e.g., network congestion exceeding a threshold), the transmission of the ROI in block 210e may occur less frequently than during periods of moderate or negligible network congestion.

In some embodiments, a central point and/or a size of the ROI may be transmitted by the user equipment to the server as part of block 210e (potentially as opposed to an indication of content associated with the ROI). Assuming that the server has a copy of the content, the server may be able to determine what content is included in the ROI when provided with the central point and the size of the ROI.

Figure 2H:
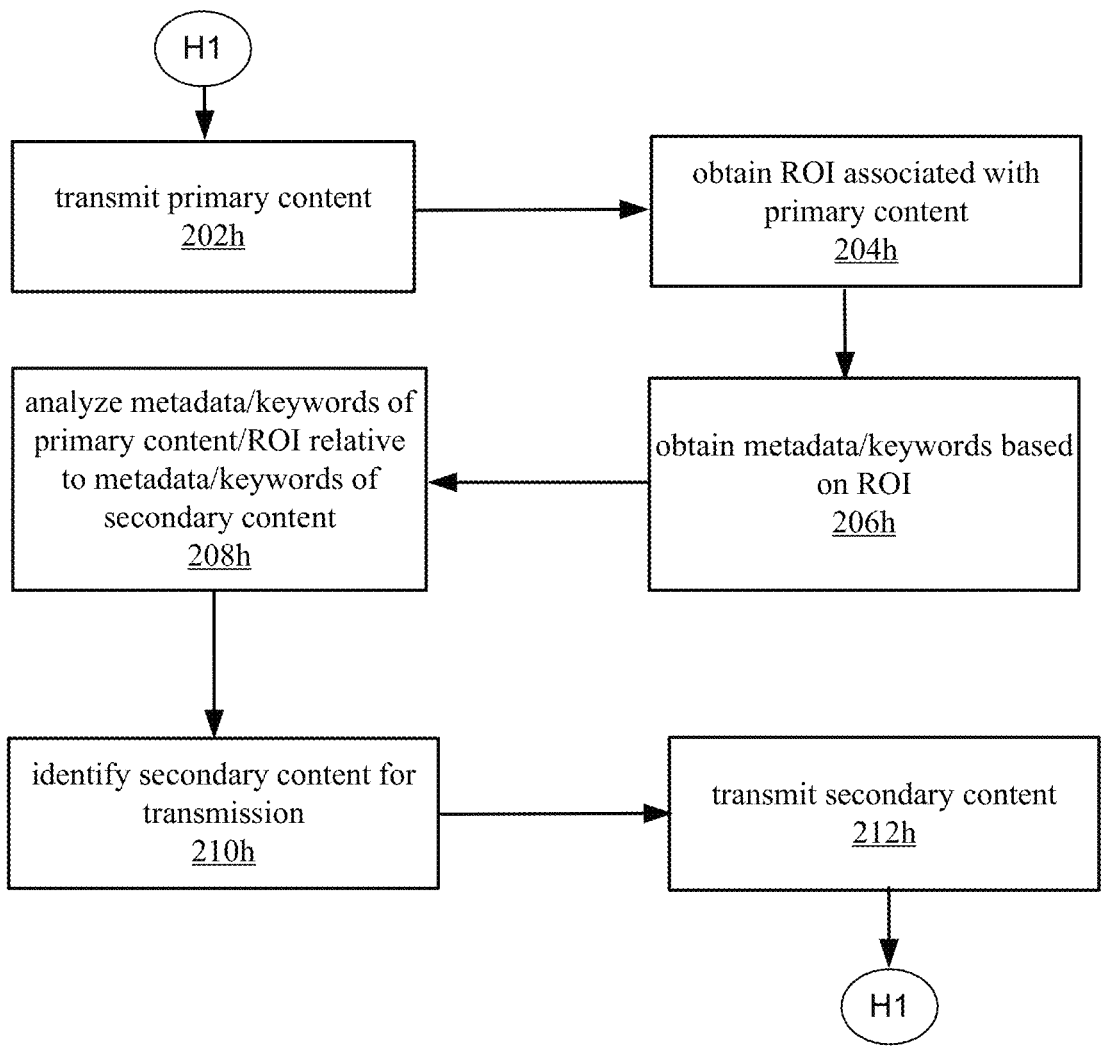
FIG. 2H depicts an illustrative embodiment of a method in accordance with various aspects described herein.

Based on the analysis referred to above in connection with block 210e/FIG. 2H, in block 212e the user equipment may receive secondary content (e.g., secondary content 210b of FIG. 2B). The secondary content of block 212e may include an advertisement. The secondary content of block 212e may include an email, a text message, a phone call, a voicemessage, an image, a video, an audio track (e.g., music), etc.

The secondary content may be presented at the user equipment as part of block 212e. For example, the secondary content received in block 212e may be presented simultaneously or in conjunction with a presentation of the primary content (see block 202e). Alternatively, the secondary content received in block 212e may be presented at a different time (e.g., a later time) than the presentation of the primary content in order to avoid distracting the user from consuming/observing the primary content.

In some embodiments, a user or user equipment may be provided an option whether to receive the secondary content of block 212e. In some embodiments, receipt of the secondary content in block 212e may be optional in the sense that if candidate secondary content items that are available to, e.g., a network operator or service provider are not a close enough match to the primary content being obtained or presented by the user equipment, the network operator/service provider may elect not to provide the user equipment with any secondary content.

From block 212e, flow may proceed to block 202e to continue receiving primary content as appropriate/needed. In this respect, a loop may be established between the blocks of the method 200e, where new/additional/modified ROIs may be identified in order to obtain new/additional/modified secondary content at the user equipment as, e.g., a playback/presentation of the primary content progresses.

FIG. 2H depicts an illustrative embodiment of a method 200h in accordance with various aspects described herein. The description provided below is based on the method 200h being executed in conjunction with the system 200b of FIG. 2B. For example, the method 200h may be at least partially executed by the server 204b and/or the server 206b of FIG. 2B. The method 200h may be adapted so as to be executed by other types of systems or devices.

In block 202h, primary content may be transmitted to, e.g., a user equipment (cross-reference the description provided above in connection with block 202e of FIG. 2E: user equipment obtains/presents primary content). The primary content may be transmitted based on a push model or a pull model as described above. The primary content may be provided to the user equipment in connection with a broadcast transmission, a multicast transmission, or a unicast transmission. The primary content may be based on one or more factors/conditions described above, such as for example a user equipment capability, a user/user equipment profile, a schedule, a date, a time, terms of a user/user equipment subscription/service agreement, etc.

To the extent that the primary content is not already available to the device(s) executing the method 200h, block 202h may include obtaining the primary content.

In block 204h, one or more ROIs associated with the primary content transmitted in block 202h may be obtained (cross-reference the description provided above in connection with block 210e of FIG. 2E: user equipment transmits identified ROI). For example, block 204h may include receiving the ROIs from a user equipment (or another device).

In block 206h, keywords may be identified/obtained based on the ROIs of block 204h. The keywords may be included as part of metadata associated with/mapped to the ROIs. For example, and referring to FIG. 2B, the keywords may be based on/included in the metadata 212b. The keywords may be based on object classification algorithms or (automated) description generation algorithms for images to create keywords for the corresponding primary content/ROIs of blocks 202h and 204h.

The creation/generation of keywords, and the application of those keywords to content (e.g., primary content), may be performed by one or more parties or entities. For example, keywords may be created or applied to content by a content creator/generator, a content distributor, etc.

The creation/generation of keywords, or the application of the keywords to content, may be performed by one or more devices. For example, a server may create the keywords or apply the keywords to the content. In some embodiments, a user equipment may include one or more algorithms, such as for example one or more of the algorithms referred to above, to create/generate keywords or apply the keywords to the content. In this respect, one or more devices may provide/supply the metadata 212b (e.g., the keywords) associated with the primary content.

In block 208h, the metadata (e.g., keywords) of block 206h may be compared to metadata (e.g., keywords) associated with secondary content items (see FIG. 2D: metadata 210d, 210d-1, and 210d-2 associated with secondary content items 210b, 210b-1, and 210b-2, respectively); cross-reference the description above in connection with block 210e of FIG. 2E regarding an analysis of the ROI transmitted by the user equipment. In some embodiments, the analysis/comparison of block 208h may include application of a first, coarse-grained filter to identify/output secondary content that is closely related to the ROI. Thereafter, a second, fine-grained filter may be applied based on secondary considerations (e.g., a user profile [which may include a social media profile, a log/history of media/content consumed, user credit/financial information, etc.], location information, schedule information, a date, a time, a capability of a user equipment, etc.) to identify one or more secondary content items output by the first, coarse-grained filter that is/are likely of interest to the user.

An analysis/comparison/filtration that may be performed in block 208h may be based on a weighting of the different inputs that are received/obtained. For example, the comparison of metadata/keywords in conjunction with an ROI may receive, e.g., 30% of a total weighting, and the secondary considerations described above may collectively receive 70% of the total weighting. The particular values for the weightings in a given embodiment may be based on one or more application settings or requirements.

As described above, an analysis/comparison/filtration of metadata (e.g., keywords) associated with a ROI/primary content and metadata (e.g., keywords) associated with secondary content may incorporate aspects of reducing (e.g., minimizing) a (vector) distance/difference between the metadata. As part of block 208h, secondary content that has a shortest distance, or a distance that is less that a threshold, may be identified/selected.

In some embodiments, the analysis of block 208h may include aspects of collaborative filtering. Collaborative filtering may incorporate aspects of automatic predictions (filtering) about the interests of a user by collecting preferences or taste information from many users (collaborating). Collaborative filtering may be based on an assumption that if a first person has the same opinion as a second person on a first issue, the first person is more likely to have the same opinion as the second person on a different, second issue, compared to the opinion of another randomly chosen person. For example, when using collaborative filtering, a recommendation system for media/content could make predictions about which content a user would like, given that user's profile (either likes or dislikes of some content she observed previously).

In block 210h, secondary content may be identified/selected for transmission to the user equipment based on the analysis of block 208h. As part of block 210h, the secondary content may be obtained (e.g., fetched) if it is not already present/available at, e.g., the server(s) performing the method 200h.

In block 212h, the secondary content identified/selected in block 210h may be transmitted to, e.g., the user equipment. In some embodiments, the secondary content that is transmitted may include, or have associated therewith, a tag that when received by the user equipment presents an alert or notification at the user equipment that secondary content has been received. For example, such an alert/notification may take the form of a chime/ding/ring sound, an icon displayed proximate or overlaid upon the primary content, an email or text message, etc.

In some embodiments, block 212h may include receiving an indication that the secondary content item is selected at, e.g., the user equipment. Receipt of such an indication may be consistent with the CTR scheme/technique described above.

In some embodiments, block 212h may be optional in the sense that block 212h might only be executed if the analysis of block 208h identifies secondary content that is believed to be of interest to the user. In this respect, the user might only be presented with secondary content that is of interest to the user.

From block 212h, flow may proceed to block 202h to continue transmitting primary content as appropriate/needed. In this respect, a loop may be established between the blocks of the method 200h, where new/additional/modified ROIs (or other inputs, such as for example the secondary considerations described above in connection with block 208h) may be identified/obtained in order to provide new/additional/modified secondary content to the user equipment as, e.g., a playback/presentation of the primary content progresses at the user equipment.

While for purposes of simplicity of explanation, the respective processes 200e and 200h are shown and described as a series of blocks in FIG. 2E and FIG. 2H, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Some of the blocks may be optional. Aspects of the methods 200e and 200h may be combined with one another in some embodiments.

Aspects of the disclosure may be used to provide supplemental/secondary content/content items to a user or user equipment that is receiving and/or presenting first/primary content/content items. Such secondary content may include advertisements associated with an object included in the primary content.

Aspects of the disclosure may facilitate and provide for a delivery of secondary content in relation to primary content. Such secondary content may include video advertisements. Aspects of the disclosure may be directed to a delivery of any other type of secondary content, such as for example display advertisements, social media advertisements, email advertisement, search engine marketing, etc.

In some embodiments, secondary content that is provided to a user equipment may include audio and/or pop-up text cues that can alert a user to events, objects, scenes, etc., that are outside of a current FoV. For example, if an event is happening (or is going to happen at some point in the future), the user can be directed to navigate in a particular direction and/or at a particular speed to arrive at the event at an appropriate time in a playback of the (primary or secondary) content. In this respect, the viewgraphs shown in FIG. 2F and FIG. 2G may be overlaid or presented in conjunction with the primary or secondary content to provide the user with a sense of orientation relative to the content. In this respect, the user may avoid a feeling of apprehension or nervousness due to not being "lost" in terms of a playback of the content.

Aspects of the disclosure may provide for security/privacy in terms of user information. For example, in conjunction with a server-proxy architecture, a server may execute one or more secondary content selection algorithms to identify/select a secondary content item to deliver/transmit to a user equipment and a proxy may handle the aggregation and anonymization of sensitive or privacy-related information.

Aspects of the disclosure may be applied in terms of an interactive education application/environment. For example, a user that is observing a panoramic video directed to a virtual museum, a botanical garden, etc., may have customized audio tracks, text boxes, images/pictures, videos, etc., playback/pop-up as the user looks in a direction of various objects.

Aspects of the disclosure may include identifying a region of interest (ROI) included in a portion of content. The ROI may include an identification/specification of an object or a scene in the content. The ROI may be based on tags/metadata associated with the content. For example, the metadata may include a timestamp associated with a frame/segment of the content that is being presented on a user equipment, orientation information (e.g., a viewing direction) associated with the user equipment and/or a field of view (FoV) relative to a reference orientation, a size of the field of view, a distance from a central point of the field of view to, e.g., an object in the FoV, gaze information, etc.

While some of the example embodiments described herein relate to panoramic content, aspects of the disclosure may be applied in connection with content of any type or format. Panoramic content can include 360-degree content, or less than 360-degree content. Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the communication network 100, the subsystems and functions of the systems or devices 200a, 200b, 200c, and 200d, and the methods 200e and 200h presented in conjunction with FIGS. 1 and 2A-2H. For example, virtualized communication network 300 can facilitate in whole or in part a selection, delivery, and presentation of primary content, an identification of a ROI included in the primary content, an identification/selection of secondary content related to the ROI (potentially based on one or more secondary considerations/inputs), and a transmission of the secondary content to a user equipment for receipt and presentation by the user equipment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
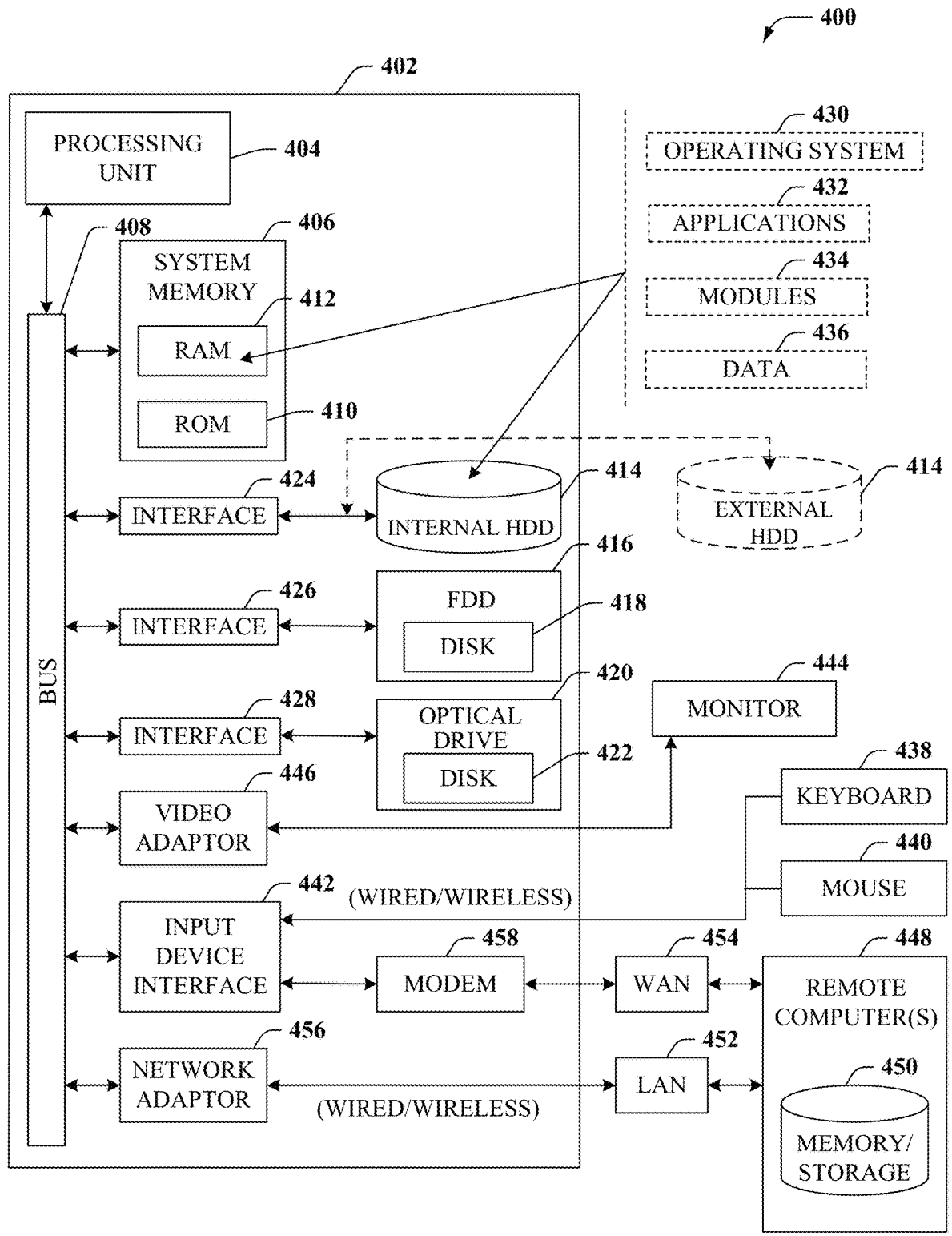
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a selection, delivery, and presentation of primary content, an identification of a ROI included in the primary content, an identification/selection of secondary content related to the ROI (potentially based on one or more secondary considerations/inputs), and a transmission of the secondary content to a user equipment for receipt and presentation by the user equipment.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
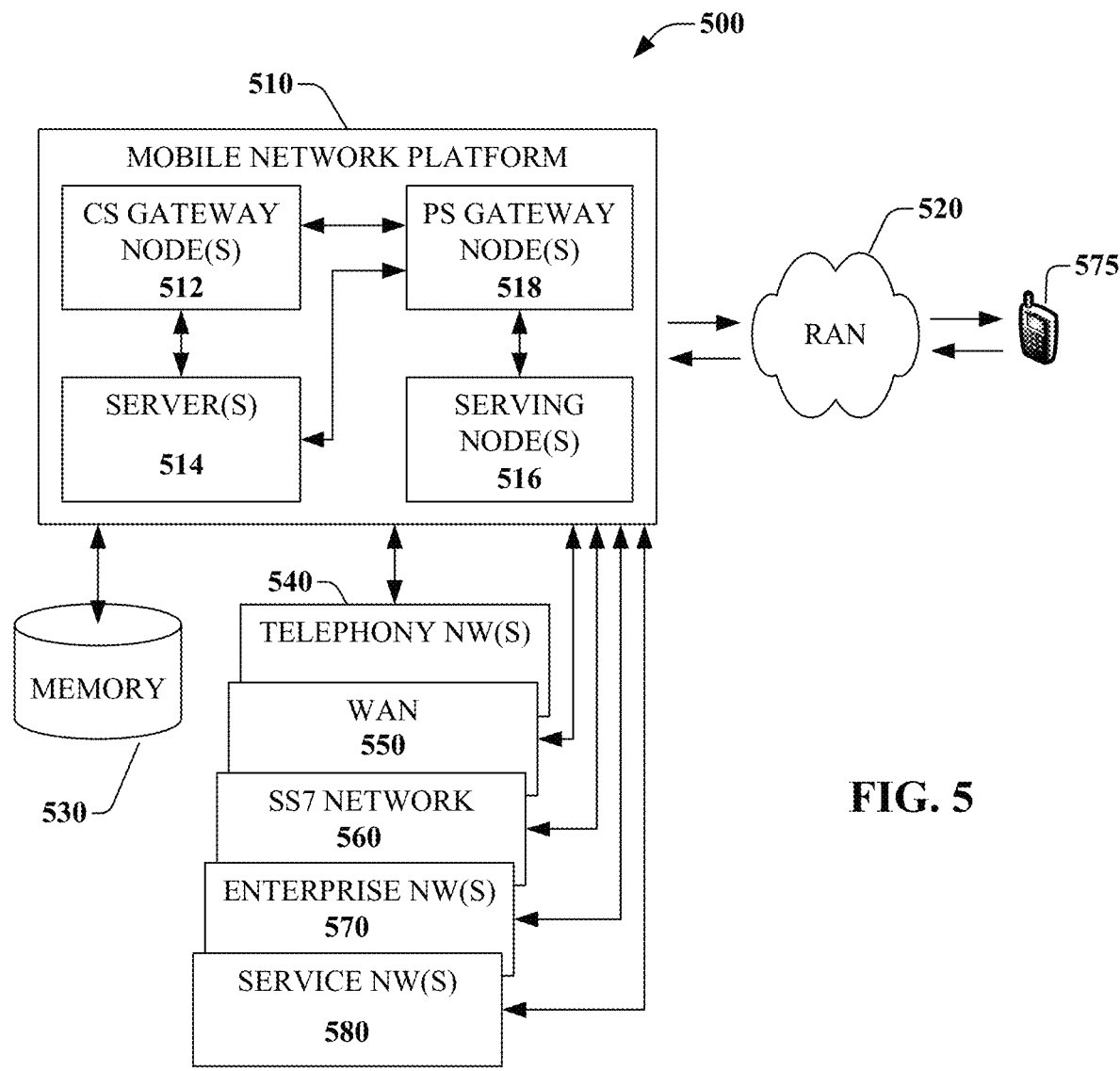
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a selection, delivery, and presentation of primary content, an identification of a ROI included in the primary content, an identification/selection of secondary content related to the ROI (potentially based on one or more secondary considerations/inputs), and a transmission of the secondary content to a user equipment for receipt and presentation by the user equipment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
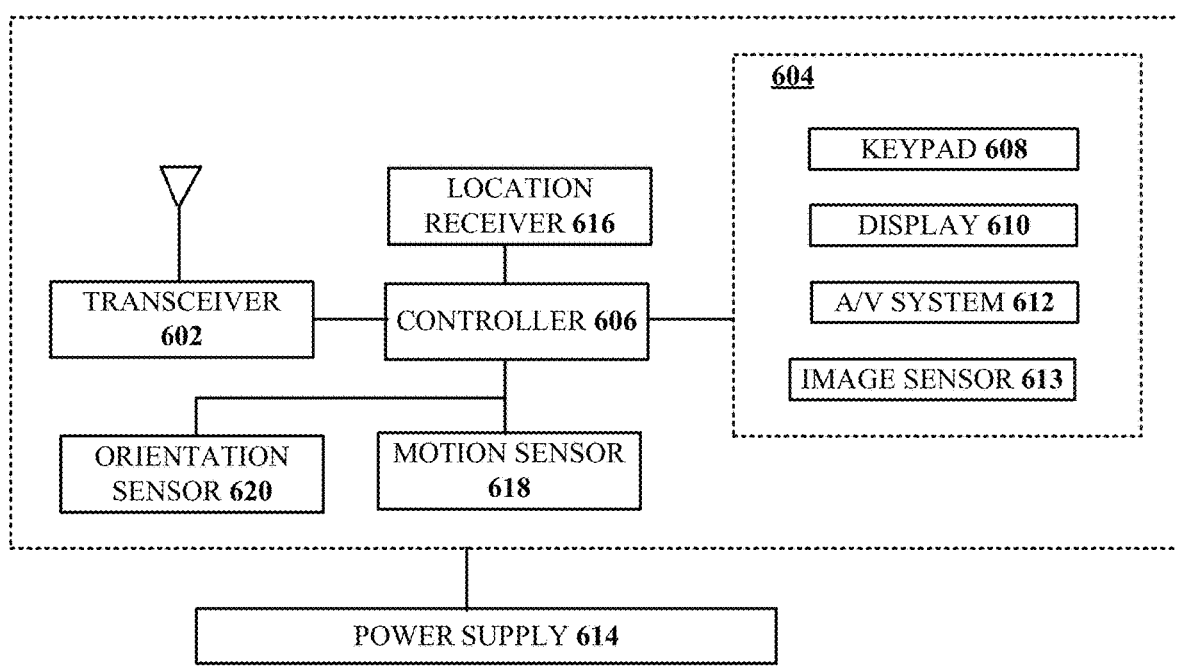
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a selection, delivery, and presentation of primary content, an identification of a ROI included in the primary content, an identification/selection of secondary content related to the ROI (potentially based on one or more secondary considerations/inputs), and a transmission of the secondary content to a user equipment for receipt and presentation by the user equipment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signalingstream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:
 presenting a first content item, wherein the first content item includes a panoramic video;
 obtaining a viewing direction with respect to the first content item during a playback of the first content item at the device;
 identifying a region of interest in the first content item responsive to obtaining the viewing direction;
 transmitting an identification of the region of interest to a server for analysis by the server of the region of interest relative to a plurality of secondary content items;
 transmitting to the server a timestamp associated with the playback of the first content item at the device, wherein a first time associated with the timestamp coincides with a second time when the viewing direction is obtained; and
 receiving, from the server, a secondary content item included in the plurality of secondary content items, wherein a first difference between first metadata associated with the region of interest and second metadata associated with the secondary content item is less than a plurality of other differences, and wherein the plurality of other differences is based on respective differences between the first metadata and other metadata associated with other secondary content items included in the plurality of secondary content items.

2. The device of claim 1, wherein the device includes a headset, a mobile communication device, a laptop, a desktop computer, or a combination thereof.

3. The device of claim 1, wherein the operations further comprise:
presenting the secondary content item.

4. The device of claim 1, wherein the secondary content item includes an advertisement.

5. The device of claim 1, wherein the operations further comprise:
determining the viewing direction based on a reference direction in a horizontal plane.

6. The device of claim 1, wherein the operations further comprise:
obtaining a size of a field of view associated with an observable area during the playback of the first content item, wherein a location of the observable area is based on the viewing direction; and
obtaining a central point of the field of view,
wherein the identifying of the region of interest is based on the size of the field of view and the central point of the field of view.

7. A non-transitory machine-readable medium, comprising executable instructions that, when executed by a processing system including a processor, facilitate performance of operations, the operations comprising:
presenting a first content item, wherein the first content item includes a video;
identifying a region of interest in the first content item in accordance with a viewing direction;
transmitting an identification of the region of interest;
transmitting a timestamp associated with a playback of the first content item, wherein a first time associated with the timestamp coincides with a second time when the viewing direction is obtained; and
receiving a secondary content item included in a plurality of secondary content items responsive to the transmitting of the identification of the region of interest,
wherein a first difference between first metadata associated with the region of interest and second metadata associated with the secondary content item is less than a plurality of other differences, and
wherein the plurality of other differences is based on respective differences between the first metadata and other metadata associated with other secondary content items included in the plurality of secondary content items.

8. The non-transitory machine-readable medium of claim 7, wherein the secondary content item is included in a portion of the first content item.

9. The non-transitory machine-readable medium of claim 7, wherein the operations further comprise:
receiving a portion of the first content item;
identifying a second region of interest associated with a playback of the portion of the first content item, wherein the second region of interest is different from the region of interest;
transmitting an identification of the second region of interest; and
receiving a second secondary content item included in the plurality of secondary content items responsive to the transmitting of the identification of the second region of interest.

10. The non-transitory machine-readable medium of claim 7, wherein the secondary content item includes a video advertisement, wherein the secondary content item includes a tag that presents an alert at the processing system that the secondary content has been received at the processing system, and wherein the operations further comprise:
transmitting an indication of a selection of the video advertisement at the processing system.

11. The non-transitory machine-readable medium of claim 7, wherein the operations further comprise:
presenting the secondary content item.

12. The non-transitory machine-readable medium of claim 11, wherein the secondary content item includes an advertisement.

13. The non-transitory machine-readable medium of claim 7, wherein the operations further comprise:
determining the viewing direction based on a reference direction in a plane.

14. A method, comprising:
presenting by a processing system including a processor, a first content item, wherein the first content item includes a video;
identifying, by the processing system, a region of interest in the first content item in accordance with a viewing direction;
transmitting, by the processing system, an identification of the region of interest;
transmitting, by the processing system, a timestamp associated with a playback of the first content item, wherein a first time associated with the timestamp coincides with a second time when the viewing direction is obtained;
receiving by the processing system, a secondary content item included in a plurality of secondary content items responsive to the transmitting of the identification of the region of interest; and
presenting, by the processing system, the secondary content item.

15. The method of claim 14, wherein a first difference between first metadata associated with the region of interest and second metadata associated with the secondary content item is less than a plurality of other differences, and wherein the plurality of other differences is based on respective differences between the first metadata and other metadata associated with other secondary content items included in the plurality of secondary content items.

16. The method of claim 14, wherein the secondary content item includes a video advertisement.

17. The method of claim 16, wherein the video advertisement is associated with an object included in the region of interest.

18. The method of claim 14, further comprising:
receiving a portion of the first content item;
identifying a second region of interest associated with a playback of the portion of the first content item, wherein the second region of interest is different from the region of interest;
transmitting an identification of the second region of interest; and receiving a second secondary content item included in the plurality of secondary content items responsive to the transmitting of the identification of the second region of interest.

19. The device of claim 1, wherein the operations further comprise:
   overlaying a viewgraph on the first content item that directs a user of the device to navigate in a particular direction and at a particular speed to arrive at an event in a playback of the secondary content item.

20. The device of claim 1, further comprising:
   a microphone,
   wherein the operations further comprise:
      obtaining a user input via the microphone,
   wherein the identifying of the region of interest in the first content item is further responsive to obtaining the user input.

* * * * *